J. W. HARRIS.
Oleometer Scales.
No. 1,764.
Patented Sept. 3, 1840.
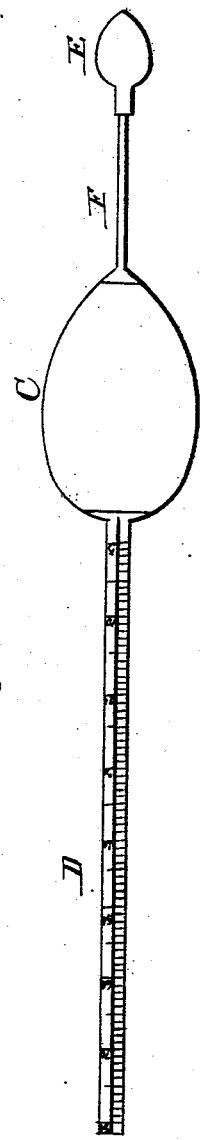
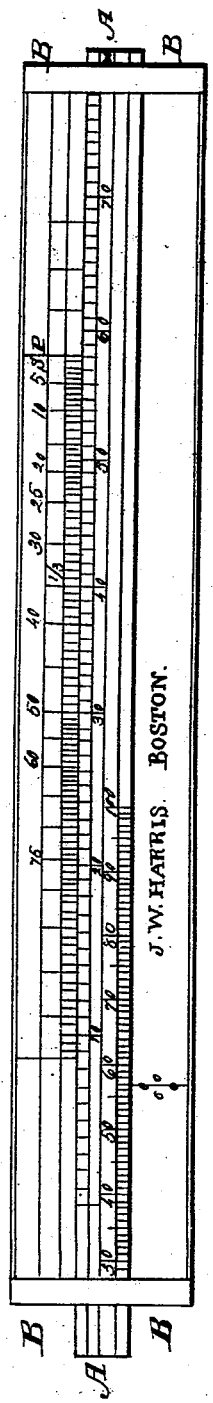

UNITED STATES PATENT OFFICE.

JOHN W. HARRIS, OF DORCHESTER, MASSACHUSETTS.

IMPROVEMENT IN MODES OF ASCERTAINING THE QUALITY OF LAMP-OIL.

Specification forming part of Letters Patent No. 1,764, dated September 3, 1840.

*To all whom it may concern:*

Be it known that I, JOHN W. HARRIS, of Dorchester, in the county of Norfolk and State of Massachusetts, have discovered a method of detecting admixtures and adulterations of whale and other inferior oils with spermaceti-oil, founded on certain principles I have applied in the construction of an instrument or graduated scale, which I term an "oleometer;" and I hereby declare that the following is a full, clear, and exact description thereof.

The oleometer-scale is an oblong wood or metal scale of two parts (see annexed drawing)—viz., a slide, A A, and a frame, B B B B. The upper portion of the slide is graduated into eighty degrees or divisions, from 0 on the left extreme to 80 on the right extreme, and marked with figures every ten degrees. The lower portion of the slide contains the degrees of temperature from 30° to 100° Fahrenheit.

On the lower portion of the frame part B B B B is an index, (marked thus o⊕o,) the upper part of which points to the degrees of temperature as the slide moves over it.

On the upper part of the frame (over the divisions on the slide) the quality of the oil is pointed out, thus: On the left of this part of the frame is the letter "W" for whale-oil. On the right is "SP" for spermaceti-oil. The space between these letters is divided into one hundred degrees, showing the adulterations from pure spermaceti-oil to pure whale-oil in percentums, and is marked with the per cents. 5, 10, 20, 25, &c. On the right of "SP" (or standard-point of sperm-oil) are three vertical marks, to show the range of weight between winter, spring, and summer manufactured sperm-oils, the temperature of the seasons at the time of manufacturing the oil having a material effect on the specific gravity of it, the standard-point "SP" being placed at the weight of winter-manufactured oil, which is the heaviest, while summer-oil is the lightest, of manufactured spermaceti-oils. This will be more fully explained hereinafter.

The oleometer-scale, as above described, together with a thermometer graduated according to Fahrenheit, is used to ascertain the indications of the oleometer, (see drawings,) which oleometer is made of silver and in every way similar to those hitherto used, being simply a hollow egg-shaped bulb, C, supporting a graduated stem, D, the stem divided into eighty degrees or divisions, from 0 to 80.

Similar to the slide of my oleometer-scale, at the bottom of the bulb, a balance-weight, E, is attached by a silver wire, F.

The uses of my oleometer-scale may be best understood by introducing the following directions for testing the purity of spermaceti-oil, viz.: First ascertain the temperature of the oil to be tested by the thermometer. Then adjust that temperature to the index o⊕o by means of the sliding part of the scale. Then place in the oil the oleometer, and it will sink to some of the divisions on the stem. Note what that division or degree is, and immediately above the corresponding number on the slide of the scale you will find the quality of the oil. For example: Suppose the temperature of the oil to be 60° Fahrenheit. Adjust that temperature to the index o⊕o by moving the slide. Now place in the oil the oleometer. If it sink to the division 60 on the stem, immediately above 60 on the slide is "SP," or sperm-oil. Should it sink to 10, above 10 on the slide is "W," or whale-oil. Should it sink to 32, it is adulterated fifty per cent. If it sink to 48½, it is adulterated twenty-five per cent. with whale-oil or other inferior oils; and thus, of whatever temperature you find the oil, the adjusting of that temperature to the index prepares the scale for the operations of the oleometer.

The principles to which my scale is applicable are, first, that the specific gravity of manufactured spermaceti-oil is materially affected by the temperature of the atmosphere at the time of expressing or straining the said oil from the crude matter. I found that crude oil, as brought from sea, after being exposed to a very low temperature—say from 10° below to 10° above 0° Fahrenheit—so as to be thoroughly congealed, and then suffered to rise in temperature, say, to 20° or 25° above 0° Fahrenheit, so that oil would flow therefrom, such oil was of a greater specific gravity than oil obtained from the same crude matter at a temperature of 60° or 70° Fahrenheit. The oil obtained at the low temperature above named is termed "winter-pressed" spermaceti-oil, and congeals only at the same temperature at which it was expressed. Thus the several oils obtained from crude matter during the months of March, May, and July are each found to obey the same law—that is to say, are specifically lighter and congeal at higher temperatures according to the seasons at which they are severally manufactured.

The instruments heretofore used for inspecting oil have their sperm-oil standard placed at so light a specific gravity that early manufactured spring-oil and winter-oil are condemned by them as adulterations of ten per cent. or twelve per cent.

The other principle I discovered and applied in my oleometer-scale is the peculiar operation of temperature on the contraction and expansion of spermaceti-oil.

The instruments heretofore used supposed an equal and uniform contraction and expansion under all temperatures—that is, their instruments or oleometers being adjusted at the temperature of 60° Fahrenheit, they gave as a general rule that for every 10° of temperature warmer or colder than 60° the stem of their oleometer should be allowed to sink or rise four divisions of its stem in the oil, and that for any excess of this allowance two per cent. for every division or degree of this excess should be allowed—that is, that at the temperature 70° the stem should sink four divisions of the stem lower than at 60°. If it sunk but two, the minus two would condemn the oil as adulterated four per cent. This rule I discovered to be erroneous, for, by proceeding with it the same oil changed its character from pure spermaceti-oil to ten or twelve per cent. adulteration. I then discovered that the contraction and expansion of spermaceti-oil followed a different law, that at higher temperatures than 60° Fahrenheit the oleometer did not sink so far in a given number of degrees of temperature as at the temperature of 60° and under, and therefore that the scale of explanation or oleometer-scale must regulate this peculiarity by enlarging the extent of the divisions on the slide beyond the figures 60.

The cause of this operation of spermaceti-oil I impute to the effect of the spermaceti or "candle-stuff," which, being the heaviest substance in crude spermaceti-oil, and particles of which pass into the oil while expressing, by the action of a high temperature upon them, become liquefied and exert an influence on the oleometer which they have not at lower temperatures.

What I claim as my invention is—

The construction of the oleometer-scale, also the mode of ascertaining the quality of spermaceti-oil at any particular temperature by means of the aforesaid scale, in combination with the oleometer and thermometer, as herein set forth.

I disclaim as my invention the oleometer itself.

J. W. HARRIS.

Witnesses:
CHARLES MASON,
JOSEPH WILLARD.